US010142892B2

(12) United States Patent
Mitsui et al.

(10) Patent No.: US 10,142,892 B2
(45) Date of Patent: Nov. 27, 2018

(54) BASE STATION AND USER TERMINAL PERFORMING CONNECTION REESTABLISHMENT PROCESSING

(71) Applicant: KYOCERA CORPORATION, Kyoto (JP)

(72) Inventors: Katsuhiro Mitsui, Kawasaki (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/327,520

(22) PCT Filed: Jul. 24, 2015

(86) PCT No.: PCT/JP2015/071076
§ 371 (c)(1),
(2) Date: Jan. 19, 2017

(87) PCT Pub. No.: WO2016/013647
PCT Pub. Date: Jan. 28, 2016

(65) Prior Publication Data
US 2017/0171784 A1 Jun. 15, 2017

(30) Foreign Application Priority Data
Jul. 25, 2014 (JP) .................................. 2014-152430

(51) Int. Cl.
*H04W 36/00* (2009.01)
*H04W 76/18* (2018.01)
(Continued)

(52) U.S. Cl.
CPC ... *H04W 36/0055* (2013.01); *H04W 36/0033* (2013.01); *H04W 36/0083* (2013.01);
(Continued)

(58) Field of Classification Search
CPC ..... H04W 36/08; H04W 36/00; H04W 76/02; H04W 76/028; H04W 36/0083;
(Continued)

(56) References Cited

U.S. PATENT DOCUMENTS

| 2008/0076434 A1* | 3/2008 | Shigaki | H04W 36/08 455/442 |
| 2013/0115949 A1* | 5/2013 | Centonza | H04W 36/245 455/436 |
| 2016/0255552 A1 | 9/2016 | Uchino et al. | |

FOREIGN PATENT DOCUMENTS

| JP | 2015-142363 A | 8/2015 |
| WO | 2014/077766 A1 | 5/2014 |
| WO | 2014/089051 A1 | 6/2014 |

OTHER PUBLICATIONS

International Search Report issued in PCT/JP2015/071076; dated Oct. 13, 2015.
(Continued)

Primary Examiner — Suhail Khan
(74) Attorney, Agent, or Firm — Studebaker & Brackett PC

(57) ABSTRACT

A base station includes a controller configured to perform connection reestablishment processing on a specific mobile station in response to reception of a connection reestablishment request signal from the specific mobile station from which a radio link failure with another base station has been detected. The controller performs processing of changing a value of a predetermined timer configured to a subordinate mobile station of the base station or the another base station based on information related to a situation of the connection reestablishment processing. The predetermined timer is a timer configured to define a maximum waiting time from
(Continued)

transmission of the connection reestablishment request signal to reception of a connection reestablishment response signal in the mobile station.

8 Claims, 14 Drawing Sheets

(51) Int. Cl.
*H04W 76/19* (2018.01)
*H04W 76/20* (2018.01)
*H04W 36/08* (2009.01)
*H04W 88/02* (2009.01)
*H04W 88/08* (2009.01)

(52) U.S. Cl.
CPC ............ *H04W 36/08* (2013.01); *H04W 76/18* (2018.02); *H04W 76/19* (2018.02); *H04W 76/20* (2018.02); *H04W 88/02* (2013.01); *H04W 88/08* (2013.01)

(58) Field of Classification Search
CPC ............... H04W 76/027; H04W 88/02; H04W 36/0055; H04W 88/08; H04W 92/20; H04W 76/04

USPC ........ 455/436, 437, 438, 439, 440, 442, 443
See application file for complete search history.

(56) References Cited

OTHER PUBLICATIONS

Written Opinion issued in PCT/JP2015/071076; dated Oct. 13, 2015.
Alcatel-Lucent et al.; "Introduction of Context Fetch"; 3GPP TSG-RAN WG3 Meeting #84; R3-141389; May 19-23, 2014; pp. 1-4; Seoul, Korea.
Alcatel-Lucent; "Describing Context Fetch in Stage 2"; 3GPP TSG-RAN WG3 Meeting #84, R3-141404, May 19-23, 2014; pp. 1-4; Seoul, Korea.
Huawei, "Avoidance of RRC re-establishment failures," 3GPP TSG RAN WG3 Meeting #83bis, R3-140586, San Jose del Cabo, Mexico, Mar. 31, 2014 to Apr. 4, 2014, 6 pp.
Supplementary Partial European Search Report dated Nov. 16, 2017, from corresponding EP Appl No. 15823938.4, 18 pp.

* cited by examiner

FIG. 7

*UE-TimersAndConstants* information element

```
-- ASN1START

UE-TimersAndConstants ::=       SEQUENCE {
    t300                        ENUMERATED {
                                    ms100, ms200, ms300, ms400, ms600, ms1000, ms1500,
   t301 TIMER CONFIGURATION VALUE   ms2000},
    t301                        ENUMERATED {
                                    ms100, ms200, ms300, ms400, ms600, ms1000, ms1500,
                                    ms2000},
    t310                        ENUMERATED {
                                    ms0, ms50, ms100, ms200, ms500, ms1000, ms2000},
    n310                        ENUMERATED {
                                    n1, n2, n3, n4, n6, n8, n10, n20},
    t311                        ENUMERATED {
                                    ms1000, ms3000, ms5000, ms10000, ms15000,
                                    ms20000, ms30000},
    n311                        ENUMERATED {
                                    n1, n2, n3, n4, n5, n6, n8, n10},
    ...
}

-- ASN1STOP
```

FIG. 8

UE Context Request

| IE/Group Name | Presence | Range | IE type and reference | Semantics description | Criticality | Assigned Criticality |
|---|---|---|---|---|---|---|
| Message Type | M | | 9.2.13 | | YES | reject |
| Failure cell PCI | M | | INTEGER (0..503, ...) | Physical Cell Identifier | YES | ignore |
| Re-establishment cell ECGI | M | | ECGI 9.2.14 | | YES | ignore |
| C-RNTI | M | | BIT STRING (SIZE (16)) | C-RNTI contained in the RRC Re-establishment Request message (TS 36.331 [9]) | YES | ignore |
| ShortMAC-I | M | | BIT STRING (SIZE (16)) | ShortMAC-I contained in the RRC Re-establishment Request message (TS 36.331 [9]) | YES | ignore |

FIG. 12

Table 1:TIMER CHANGE REQUEST message

| IE/Group Name | Presence | Range | IE type and reference |
|---|---|---|---|
| Message Type | M | | 9.2.13 |
| Timer Change Request | M | | |
| Request Timer Indicator | O | | ENUMERATED(ms 100, ms200, ms300, ms400, ms600, ms1000, ms1500, ms2000) |

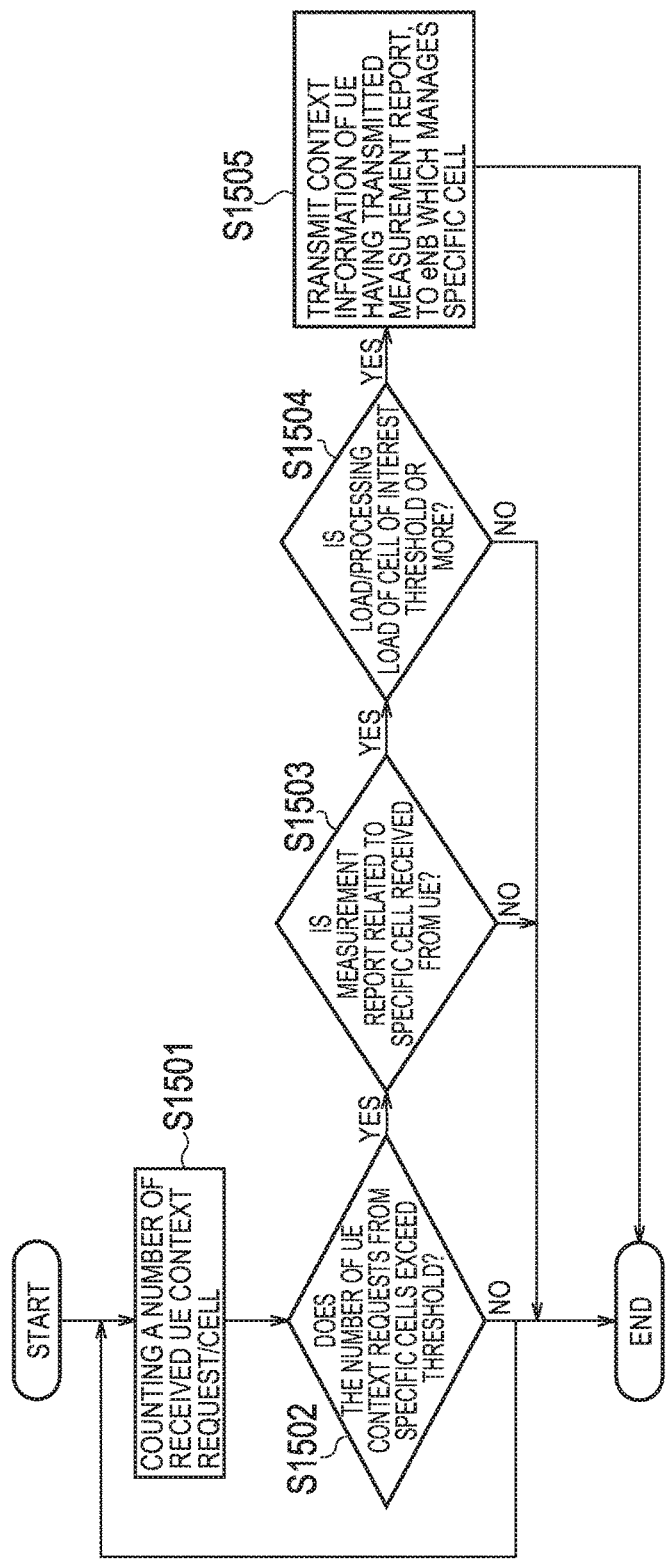

BASE STATION AND USER TERMINAL PERFORMING CONNECTION REESTABLISHMENT PROCESSING

TECHNICAL FIELD

The present application relates to a base station and a mobile station used in a mobile communication system.

BACKGROUND ART

According to 3GPP (3rd Generation Partnership Project) which is a mobile communication system standardization project has been studied a technique of performing UE Context Fetch during connection reestablishment processing performed in response to a radio link failure (RLF) (see Non Patent Literatures 1 and 2).

UE Context (mobile station information) is information which is necessary for a connection reestablishment destination base station to specify a mobile station during RRC Connection reestablishment (i.e. connection reestablishment). UE Context Fetch means that a connection reestablishment destination base station makes a reference as to UE Context acquired from the mobile station during a connection reestablishment procedure, to a base station which the mobile station has been communicating with prior to a radio link failure.

CITATION LIST

Non Patent Literature

Non patent Literature 1: 3GPP Contribution "R3-141389", May 19, 2014
Non patent Literature 2: 3GPP Contribution "R3-141404", May 19, 2014

SUMMARY OF INVENTION

A base station according to a first aspect includes a controller configured to perform connection reestablishment processing on a specific mobile station which has detected a radio link failure with another base station, in response to reception of a connection reestablishment request signal from the specific mobile station. The controller is configured to perform processing of changing a value of a predetermined timer to be set to a subordinate mobile station of the base station or the another base station, based on information related to a situation of the connection reestablishment processing. The predetermined timer is a timer that defines a maximum waiting time from transmission of the connection reestablishment request signal to reception of a connection reestablishment response signal in the mobile station.

In the first aspect, the controller is configured to perform processing of broadcasting configuration information indicating the changed value of the predetermined timer, in a cell managed by the base station.

In the first aspect, the controller is configured to perform processing of transmitting configuration information indicating the changed value of the predetermined timer, to the another base station.

In the first aspect, the controller is configured to collect the information related to the situation of the connection reestablishment processing over a certain period of time, and to perform the processing of changing the value of the predetermined timer based on the collected information.

In the first aspect, the information related to the situation of the connection reestablishment processing includes a time taken until the base station receives a context response signal from the another base station after the base station transmits a context request signal to the another base station.

In the first aspect, the context request signal is a reference request for making a reference to the specific mobile station, or a context information request for requesting transmission of context information of the specific mobile station.

In the first aspect, the information related to the situation of the connection reestablishment processing includes information indicating a rate that the base station does not receive a corresponding connection reestablishment complete signal among connection reestablishment response signals transmitted by the base station.

A base station according to a second aspect includes a controller configured to perform processing of receiving a context request related to a mobile station which has detected a radio link failure with the base station, from another base station having received a connection reestablishment request signal from the mobile station. The controller is configured to perform processing of changing a handover parameter to be applied to the another base station by the base station, or a transmission timing of context information of the mobile station from the base station to the another base station, based on a reception situation of the context request.

In the second aspect, the reception situation of the context request is a number of times of reception of the context request during a predetermined period.

In the second aspect, when a number of times of reception of the context request per unit time exceeds a threshold, the controller is configured to perform processing of adjusting the handover parameter to make it easy to perform handover from the base station to the another base station.

In the second aspect, when a number of times of reception of the context request per unit time exceeds a threshold, the controller is configured to perform processing of transmitting the context information to the another base station even if the base station does not receive the context request form the another base station.

In the second aspect, when the number of times of reception of the context request per unit time exceeds the threshold, and when a load related to the base station is a predetermined load or more, the controller is configured to perform processing of transmitting the context information to the another base station even if the base station does not receive the context request from the another base station.

A mobile station according to a third aspect includes a controller configured to transmit a connection reestablishment request signal for requesting connection reestablishment to another base station when a radio link failure with a base station is detected. The controller is configured to wait for reception of a connection reestablishment response signal from the another base station until a value of a timer expires after transmitting the connection reestablishment request signal. The value of the timer is set based on information related to a situation of connection reestablishment processing in the another base station.

BRIEF DESCRIPTION OF DRAWINGS

FIG. 7 is a view illustrating a timer configuration value according to the first embodiment through the fourth embodiment.

FIG. 8 is a view illustrating a message format according to the first embodiment through the fourth embodiment.

FIG. 12 is a view illustrating a message format according to the first embodiment.

FIG. 15 is a flowchart according to the fourth embodiment.

DESCRIPTION OF EMBODIMENTS

[Outline of Embodiments]

Figure 1:
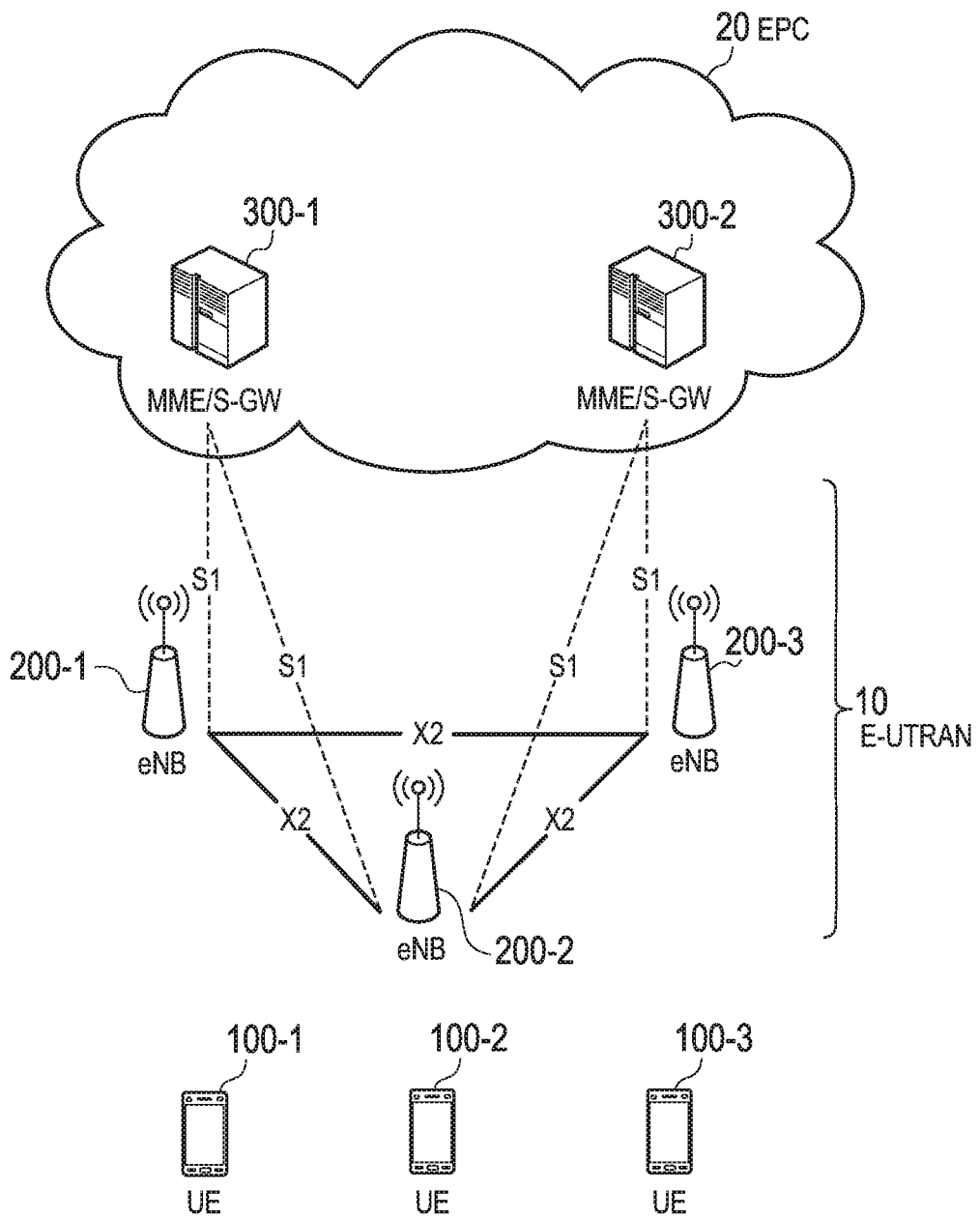
FIG. 1 is a configuration diagram of an LTE system according to a first embodiment through a fourth embodiment.

A communication control method according to a first embodiment is a communication control method for performing connection reestablishment processing between a mobile station and a second base station configured to manage a cell reselected after a radio link with a first base station is disconnected. The method includes the steps of: at the second base station, broadcasting timer configuration information for specifying a duration of a predetermined timer activated by the mobile station, to the cell managed by the second base station; at the mobile station, transmitting a connection reestablishment request signal including mobile station information for specifying the mobile station information, to the second base station after the radio link is disconnected, and activating the predetermined timer; at the second base station, when receiving the connection reestablishment request signal from the mobile station, transmitting a mobile station reference request including the mobile station information fetched from the mobile station, to the first base station; at the first base station, checking whether or not the mobile station information fetched from the second base station and the held mobile station information match, in response to the mobile station reference request, and transmitting a reference result response; and at the second base station, when receiving the reference result response indicating that the pieces of mobile station information have matched as a result of the reference, transmitting a response signal to the connection reestablishment request signal, to the mobile station. The timer configuration information is changed according to a reference time taken until the second base station receives the reference result response after transmitting the mobile station reference request to the first base station, and the predetermined timer indicates a time at which the connection reestablishment request signal transmitted by the mobile station times out.

In the communication control method according to the first embodiment, the second base station instructs the first base station to change the timer configuration information individually configured to the mobile station, according to the reference time.

In the communication control method according to the first embodiment, the second base station collects the reference times for a certain period of time, and changes the timer configuration information according to the collected reference times.

A communication control method according to a second embodiment is a communication control method for reestablishing connection between a mobile station and a base station configured to manage a cell reselected after a radio link is disconnected. The method includes the steps of: at the base station, broadcasting timer configuration information for specifying a duration of a predetermined timer activated by the mobile station, to the cell managed by the base station; at the mobile station, transmitting a connection reestablishment request signal to the base station after the radio link is disconnected, and activating the predetermined timer; at the base station, receiving a connection reestablishment request signal from the mobile station; and at the base station, transmitting a connection reestablishment response signal. The predetermined timer indicates a time at which the connection reestablishment request signal transmitted by the mobile station times out, and the base station calculates a connection reestablishment failure rate that, even though the connection reestablishment response signal has been transmitted, a connection reestablishment complete signal is not received from the mobile station, and changes the timer configuration information to broadcast in a subordinate cell of the base station according to the connection reestablishment failure rate.

In the communication control method according to the second embodiment, the base station instructs a base station configured to manage a cell which the mobile station has been communicating with prior to reselection of the cell, to change the timer configuration information individually configured to the mobile station according to the connection reestablishment failure rate.

A communication control method according to a third embodiment is a communication control method for performing connection reestablishment processing between a mobile station and a second base station configured to manage a cell reselected after a radio link with a first base station is disconnected. The method includes the steps of: at the first base station, receiving a mobile station reference request related to the connection reestablishment processing from the second base station; and at the first base station, counting the number of mobile station reference requests received in a predetermined period. The first base station adjusts a handover parameter of the first base station and the second base station according to the number of mobile station reference requests received in the predetermined period.

In the communication control method according to the third embodiment, when the number of mobile station reference requests exceeds a predetermined threshold, the first base station adjusts the handover parameter to make it easy to perform handover from the first base station to the second base station.

A communication control method according to a fourth embodiment is a communication control method used between a first base station configured to manage a cell which a mobile station is communicating with, and a second base station configured to manage a movement destination candidate cell of the mobile station. The method includes the steps of: at the first base station, receiving a measurement report including the cell managed by the second base station as a movement destination candidate from the mobile station; and at the first base station, when predetermined conditions are satisfied, notifying the second base station of mobile station information for specifying the mobile station. The predetermined conditions include that the first base station receives a predetermined number of mobile station information requests made in response to connection reestablishment processing from the second base station in the predetermined period.

In the communication control method according to the fourth embodiment, the predetermined conditions include that the first base station receives the predetermined number of mobile station information requests made in response to connection reestablishment processing from the second base station in the predetermined period, and one of a load a subordinate cell of the first base station which the mobile station is communicating with and a load of the first base station is a predetermined load or more.

A base station according to the first embodiment is a second base station configured to perform connection reestablishment processing between a mobile station and the second base station configured to manage a cell reselected after a radio link with a first base station is disconnected. The method includes: a first transmitter configured to broadcast timer configuration information for specifying a duration of a predetermined timer activated by the mobile station, to the managed cell; a first receiver configured to receive a connection reestablishment request including mobile station information for specifying the mobile station, from the mobile station; a second transmitter configured to, when receiving the connection reestablishment request signal from the mobile station, transmit a mobile station reference request including the mobile station information fetched from the mobile station, to the first base station; and a second receiver configured to receive a reference result response obtained by the first base station by checking whether or not the mobile station information fetched from the second base station and the held mobile station information match, in response to the mobile station reference request, and transmit a reference result response. When receiving a response indicating that the pieces of mobile station information have matched as a result of the reference, the first transmitter transmits a response signal to the connection reestablishment request signal, to the mobile station. Further, the timer configuration information is changed according to a reference time taken until the second base station receives the reference result response after transmitting the mobile station reference request to the first base station, and the predetermined timer indicates a time at which the connection reestablishment request signal transmitted by the mobile station times out.

The base station according to the first embodiment instructs the first base station to change the timer configuration information individually configured to the mobile station, according to the reference time.

A base station according to the second embodiment is a base station configured to reestablish connection between a mobile station and a base station reselected after a radio link is disconnected, and configured to manage a cell. The base station includes: a transmitter configured to broadcast timer configuration information for specifying a duration of a predetermined timer activated by the mobile station, to the managed cell; and a receiver configured to receive a connection reestablishment request signal from the mobile station, and the transmitter transmits the connection reestablishment response signal. The predetermined timer indicates a time at which the connection reestablishment request signal transmitted by the mobile station times out. The base station calculates a connection reestablishment failure rate that, even though the connection reestablishment response signal has been transmitted, a connection reestablishment complete signal is not received from the mobile station, and changes the timer configuration information to broadcast in a subordinate cell according to the connection reestablishment failure rate.

The base station according to the second embodiment instructs a base station configured to manage a cell which the mobile station has been communicating with prior to reselection of the cell, to change the timer configuration information individually configured to the mobile station according to the connection reestablishment failure rate.

A base station according to the third embodiment is a base station configured to operate as a first base station to perform connection reestablishment processing between a mobile station and a second base station configured to manage a cell reselected after a radio link with the first base station is disconnected. The base station includes a receiver configured to receive a mobile station reference request related to the connection reestablishment processing from the second base station, and the base station counts the number of mobile station reference requests received in a predetermined period, and adjusts a handover parameter of the first base station and the second base station according to the number of mobile station reference requests received in the predetermined period.

A base station according to the fourth embodiment is a base station configured to operate as a first base station to control communication between a first base station configured to manage a cell which a mobile station is communicating with, and a second base station configured to manage a movement destination candidate cell of the mobile station is controlled. The base station includes: a receiver configured to receive a measurement report including the cell managed by the second base station as a movement destination candidate from the mobile station; and a transmitter configured to, when predetermined conditions are satisfied, notifying the second base station of mobile station information for specifying the mobile station. The predetermined conditions include that the first base station receives a predetermined number of mobile station information requests made in response to connection reestablishment processing from the second base station in the predetermined period.

First Embodiment (System Configuration)

FIG. 1 is a configuration diagram of an LTE system according to the first embodiment.

As illustrated in FIG. 1, the LTE system according to the first embodiment includes UEs (User Equipment) 100, an E-UTRAN (Evolved-Universal Terrestrial Radio Access Network) 10 and an EPC (Evolved Packet Core) 20.

Each UE 100 corresponds to a user terminal. The UE 100 is a mobile communication apparatus, and performs radio communication with cells (serving cells). A configuration of the UE 100 will be described below.

The E-UTRAN 10 corresponds to a radio access network. The E-UTRAN 10 includes eNBs 200 (evolved Node-B).

Each eNB 200 corresponds to a base station. The eNBs 200 are connected with each other via an X2 interface. A configuration of each eNB 200 will be described below.

The eNB 200 manages one or a plurality of cells, and performs radio communication with the UEs 100 which have established connection with the cell of this eNB 200. The eNB 200 includes a radio resource managing (RRM) function, a user data routing function and a measurement control function for mobility control and scheduling. The "cell" is used not only as a term which indicates a minimum unit of a radio communication area, and but also as a term indicating a function of performing radio communication with the UEs 100.

The EPC 20 corresponds to a core network. The EPC 20 includes MMEs (Mobility Management Entity)/S-GW (Serving-Gateway) 300. Each MME performs various mobility control on the UEs 100. Each S-GW controls user data transfer. Each MME/S-GW300 is connected with each eNB 200 via an S1 interface.

Figure 2:
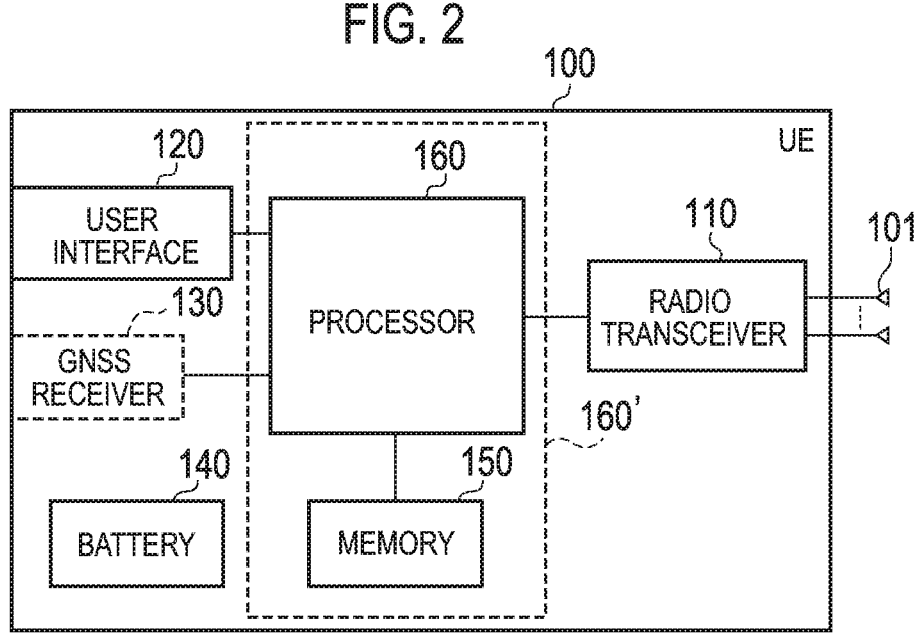
FIG. 2 is a block diagram of an UE according to the first embodiment through the fourth embodiment.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150 and a processor 160. The memory 150 and the processor 160 configure a controller. The UE 100 may not include the GNSS receiver 130. Further, the memory 150 and the processor 160 may be integrated as a set (i.e., a chip set) to configure a processor 160'.

The antennas 101 and the radio transceiver 110 are used to transmit and receive radio signals. The radio transceiver 110 converts a baseband signal (transmission signal) outputted from the processor 160 into a radio signal to transmit from each antenna 101. Further, the radio transceiver 110 converts the radio signal received at each antenna 101 into a baseband signal (received signal) to output to the processor 160.

The user interface 120 is an interface with each user who possesses each UE 100, and includes, for example, a display, a microphone, a speaker and various buttons. The user interface 120 receives a user's operation, and outputs a signal indicating contents of the operation to the processor 160. The GNSS receiver 130 receives a GNSS signal and outputs the received signal to the processor 160 to fetch position information indicating a geographical position of each UE 100. The battery 140 stores power which needs to be supplied to each block of each UE 100.

The memory 150 stores programs executed by the processor 160 and information used for processing performed by the processor 160. The processor 160 includes a baseband processor which modules, demodulates, encodes and decodes baseband signals, and a CPU (Central Processing Unit) which executes the programs stored in the memory 150 to execute various types of processing. The processor 160 may further include a codec which encodes and decodes audio and video signals. The processor 160 executes various types of processing and various communication protocols described below.

Figure 3:
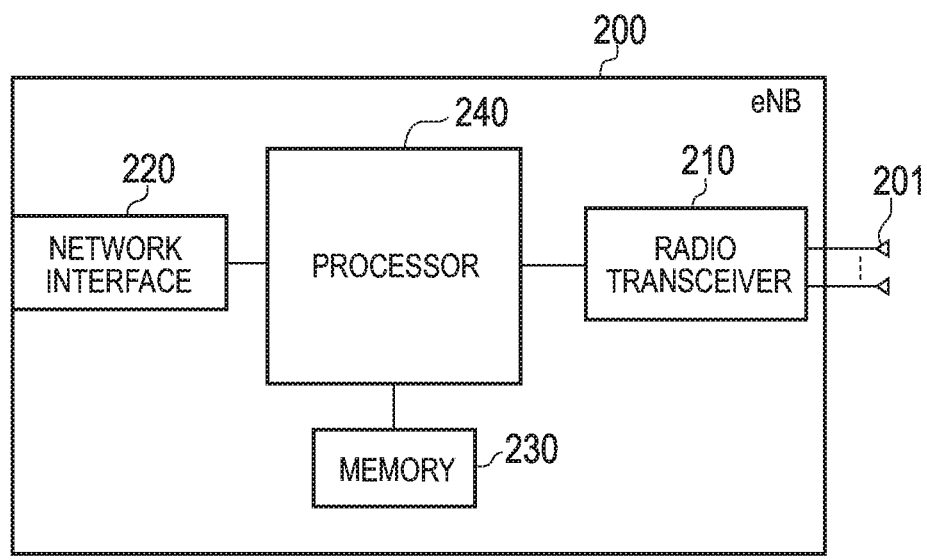
FIG. 3 is a block diagram of an eNB according to the first embodiment through the fourth embodiment.

FIG. 3 is a block diagram of the eNB 200. As illustrated in FIG. 3, the eNB 200 includes a plurality of antennas 201, a radio transceiver 210, a network interface 220, a memory 230 and a processor 240. The memory 230 and the processor 240 configure a controller. Further, the memory 230 and the processor 240 may be integrated as a set (i.e., a chip set) to configure a processor.

The antennas 201 and the radio transceiver 210 are used to transmit and receive radio signals. The radio transceiver 210 converts a baseband signal (transmission signal) outputted from the processor 240 into a radio signal to transmit from each antenna 201. Further, the radio transceiver 210 converts the radio signal received at each antenna 201 into a baseband signal (received signal) to output to the processor 240.

The network interface 220 is connected with the neighboring eNBs 200 via the X2 interface, and is connected with the MME/S-GWs 300 via the S1 interface. The network interface 220 is used for communication performed on the X2 interface and communication performed on the S1 interface.

The memory 230 stores programs executed by the processor 240 and information used for processing performed by the processor 240. The processor 240 includes a baseband processor which modules, demodulates, encodes and decodes baseband signals, and a CPU which executes the programs stored in the memory 230 to execute various types of processing. The processor 240 executes various types of processing and various communication protocols described below.

Figure 4:
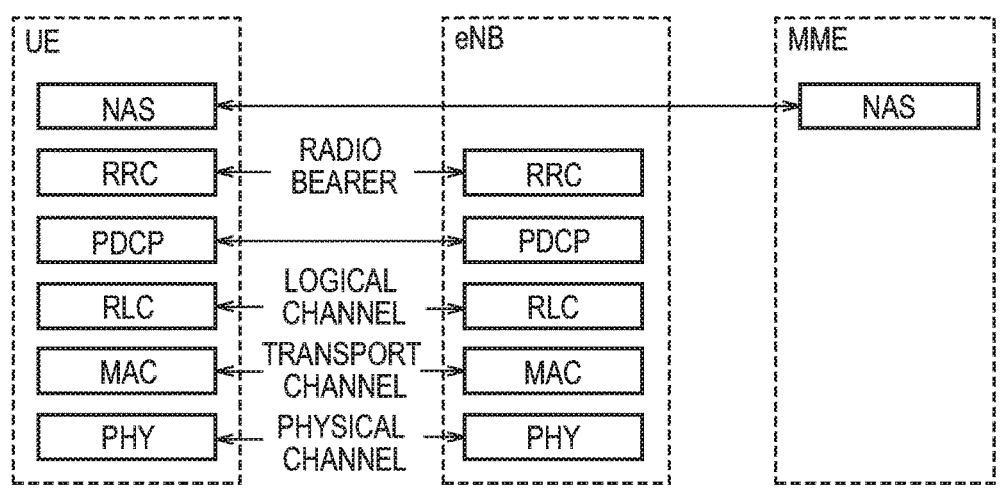
FIG. 4 is a protocol stack diagram of a radio interface according to the first embodiment through the fourth embodiment.

FIG. 4 is a protocol stack diagram of a radio interface of the LTE system. As illustrated in FIG. 4, a radio interface protocol is classified into a first layer to a third layer of an OSI reference model, and the first layer is a physical (PHY) layer. The second layer includes a MAC (Medium Access Control) layer, a RLC (Radio Link Control) layer and a PDCP (Packet Data Convergence Protocol) layer. The third layer includes a RRC (Radio Resource Control) layer.

In the physical layer, encoding, decoding, modulation, demodulation, antenna mapping, antenna demapping, resource mapping and resource demapping are performed. User data and control signals are transmitted between the physical layer of each UE 100 and the physical layer of each eNB 200 via a physical channel.

In the MAC layer, data prioritization control, retransmission control according to hybrid ARQ (HARQ), and a random access procedure during RRC connection establishment are performed. User data and a control signal are transmitted between the MAC layer of each UE 100 and the MAC layer of each eNB 200 via a transport channel. The MAC layer of each eNB 200 includes a scheduler which determines a transport format (a transport block size and a modulating/encoding method) in uplink and downlink, and allocation resource blocks for each UE 100.

In the RLC layer, data is transmitted to the RLC layer at a reception side by using functions of the MAC layer and the physical layer. User data and control signals are transmitted between the RLC layer of each UE 100 and the RLC layer of each eNB 200 via a logical channel.

In the PDCP layer, header compression, header extension, encryption and decoding are performed.

The RRC layer is defined only in a control plane which handles a control signal. A control signal (RRC message) for various configurations is transmitted between the RRC layer of each UE 100 and the RRC layer of each eNB 200. In the RRC layer, a logical channel, a transport channel and a physical channel are controlled in response to establishment, reestablishment and release of a radio bearer. When the RRC of each UE 100 and the RRC of each eNB 200 are connected (RRC connection), each UE 100 is in a RRC connected state and, when this is not a case, each UE 100 is in a RRC idle state.

In a NAS (Non-Access Stratum) layer is a higher layer than the RRC layer, session management and mobility management are performed.

The LTE system applies OFDMA (Orthogonal Frequency Division Multiplexing Access) to the downlink and applies SC-FDMA (Single Carrier Frequency Division Multiple Access) to the uplink.

A radio frame is configured by 10 subframes aligned in a time domain. Each subframe is configured by two slots aligned in the time domain. A length of each subframe is 1 ms, and a length of each slot is 0.5 ms. Each subframe includes a plurality of resource blocks (RB) in a frequency domain, and includes a plurality of symbols in the time domain. Each resource block includes a plurality of subcarriers in the frequency domain. Among radio resources (time and frequency resources) allocated to each UE 100, a frequency resource can be specified based on a resource block, and a time resource can be specified based on a subframe (or a slot).

An interval of several head symbols of each subframe in the downlink is a domain which is used as a physical downlink control channel (PDCCH) for mainly transmitting control signals. Further, the rest of the interval of each subframe is a domain which can be used as a physical downlink shared channel (PDSCH) for mainly transmitting user data.

Both ends of each subframe in the frequency domain in the uplink are domains which are used as a physical uplink control channel (PUCCH) for mainly transmitting control signals. The rest of each subframe is a domain which can be used as a physical downlink shared channel (PUSCH) for mainly transmitting user data.

(Connection Reestablishing Operation: Overall)

An operation related to connection reestablishment of each UE 100 will be described with reference to FIGS. 5 to 7.

Figure 5:
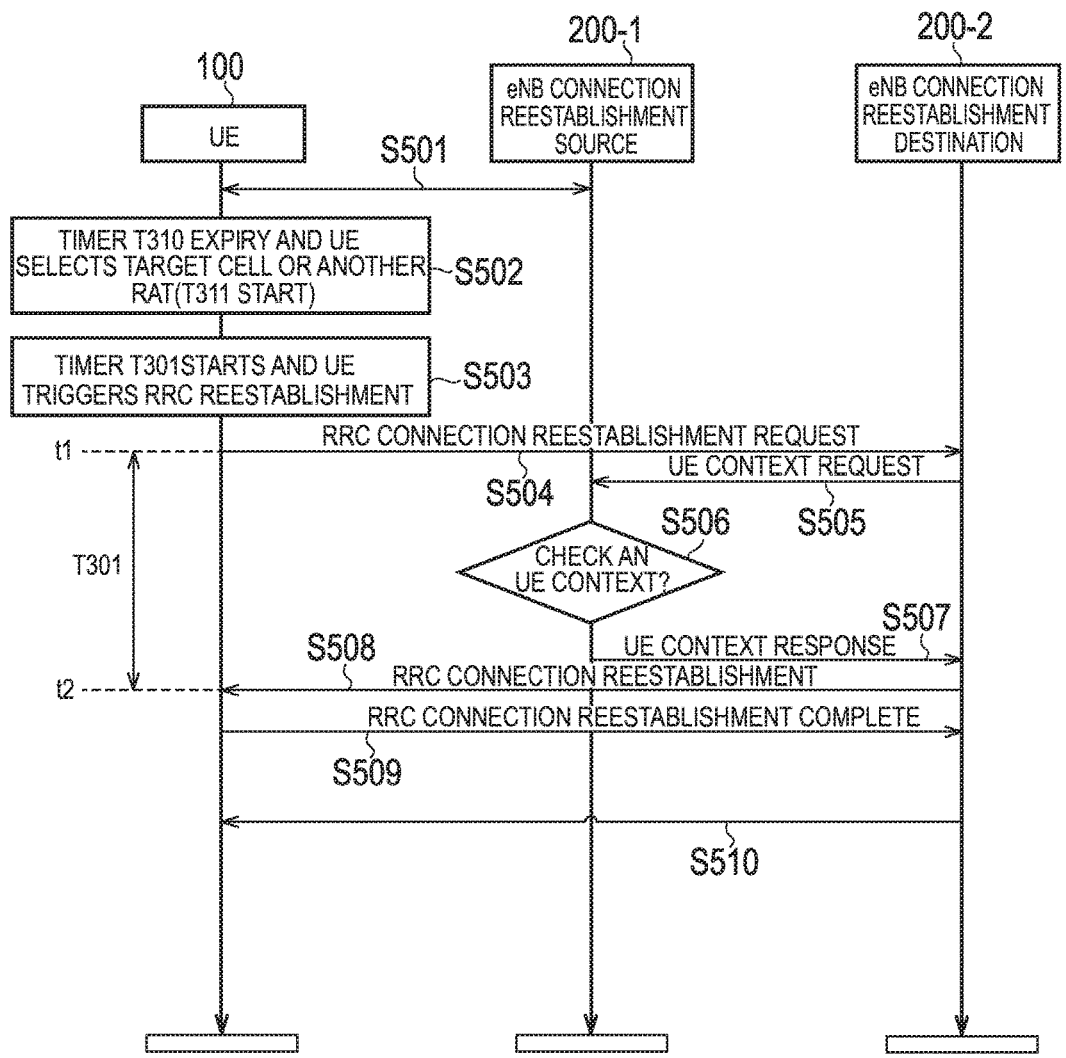
FIG. 5 is a connection reestablishment sequence diagram in case of a radio link failure according to the first embodiment through the fourth embodiment.
Figure 6:
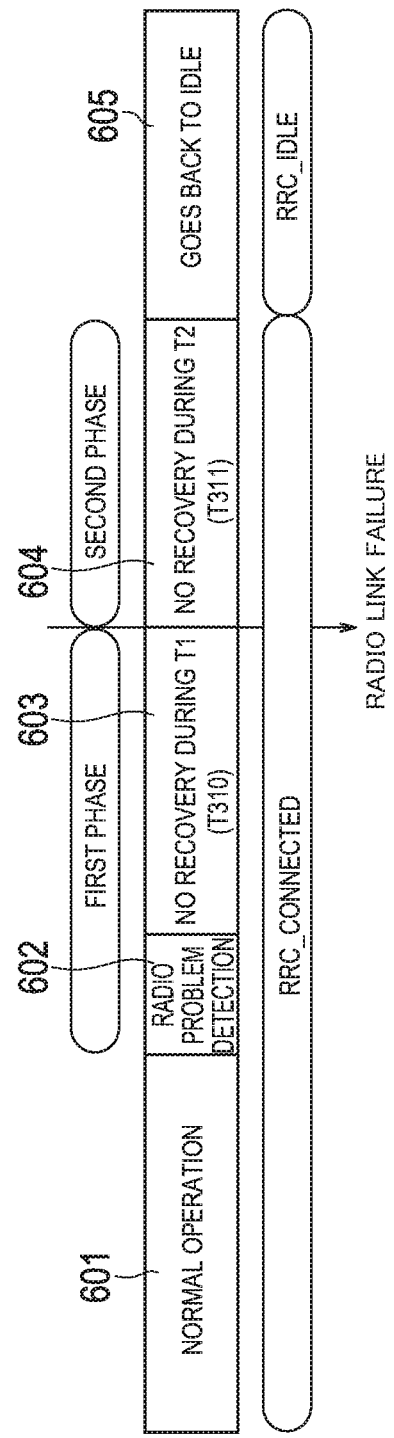
FIG. 6 is a view illustrating a state transition of the UE according to the first embodiment through the fourth embodiment.

FIG. 5 is a view illustrating a connection reestablishment sequence of reestablishing connection with a connection reestablishment destination eNB 200-2 which manages a cell reselected by the UE 100.

The UE 100 is communicating with a cell managed by a connection reestablishment source eNB 200-1 (S501). In this case, when detecting a problem of a radio link (Radio Problem Detection), the UE 100 activates a timer T310. More specifically, when receiving or detecting Out of sync indication N310 times, the UE 100 determines that a radio link failure has occurred, and activates the timer T310. When the radio link with the cell which the UE 100 is communicating with cannot be recovered during the operation of the timer T310, the UE 100 transitions to an operation of selecting a connection reestablishment destination cell including other radio communication systems (S502). When starting a procedure of selecting the connection reestablishment destination cell, the UE 100 activates a timer T311.

When connection reestablishment is not completed at an expiration of the timer T311, the UE 100 transitions from a Connected state (RRC connected state) to an Idle state (RRC idle state).

The UE 100 transmits RRC Connection Reestablishment Request which is a connection reestablishment request signal to the connection reestablishment destination eNB 200-2 which manages the reselected cell, and activates a timer T301 (S503 and S504). The timer T301 (predetermined timer) is a timer which defines a maximum waiting time between transmission of the connection reestablishment request signal (RRC Connection Reestablishment Request) to reception of a connection reestablishment response signal (RRC Connection Reestablishment) in the UE 100.

Further, the UE 100 stops the timer T301 when receiving RRC Connection Reestablishment from the connection reestablishment destination eNB 200-2.

RRC Connection Reestablishment Request includes UE Context. UE Context includes a physical cell ID (Failure cell PCI) of a cell in which a radio link failure has occurred, a temporary ID (C-RNTI) of a cell in which a radio link failure of the UE 100 has occurred, and a message approval parameter (Short MAC-I).

When receiving RRC Connection Reestablishment Request, the connection reestablishment destination eNB 200-2 specifies a cell which the UE 100 has been communicating with prior to occurrence of a radio link failure, and an eNB (connection reestablishment source eNB 200-1) which manages this cell.

The connection reestablishment destination eNB 200-2 transmits UE Context Request (context request signal) to the connection reestablishment source eNB 200-1 (S505). Here, UE Context Request includes PCI, C-RNTI and Short MAC-I. UE Context Request is a reference request for making a reference to the UE 100 (specific mobile station). Alternatively, UE Context Request may be a context information request for requesting transmission of context information of the UE 100 (specific mobile station).

The connection reestablishment source eNB 200-1 checks whether or not held UE Context of the UE 100 matches PCI, C-RNTI and Short MAC-I received in S505 (S506). When the match is found, the connection reestablishment source eNB 200-1 transmits UE Context Response to the connection reestablishment destination eNB 200-2 (S507). UE Context Response may include UE Context.

A procedure of transmitting and receiving UE Context Request and UE Context Response between the eNBs 200 refers to UE Context Fetch. When the match is not found in S506, the connection reestablishment source eNB 200-1 transmits UE Context Failure to the connection reestablishment destination eNB 200-2.

When receiving UE Context Response, the connection reestablishment destination eNB 200-2 transmits RRC Connection Reestablishment which is a response signal to the connection reestablishment request signal, to the UE 100 (S508).

When the UE 100 receives RRC Connection Reestablishment from the connection reestablishment destination eNB 200-2, if the timer T301 is operating, the UE 100 transmits RRC Connection Reestablishment Complete which is a connection reestablishment complete signal to the connection reestablishment destination eNB 200-2 (S509). Further, the UE 100 starts communicating with the connection reestablishment destination eNB 200-2 by using the reselected cell (S510).

Meanwhile, when the UE 100 receives RRC Connection Reestablishment, if the timer T301 has expired, the UE 100 determines that a connection reestablishment procedure has failed and transitions to the Idle state.

(Connection Reestablishing Operation: UE)

An operation of the UE 100 during connection reestablishment will be described with reference to FIG. 6.

When performing normal communication (Normal Operation 601), the UE 100 detects a radio link problem (radio problem detection 602) in response to reception or detection of Out of sync indication N310 times. Further, the UE 100 activates the timer T310 in response to detection of the radio link problem.

A period of the timer T310 is T1. When detecting In-Sync indication N311 times during an operation of the timer T310, the UE 100 determines that the radio link has recovered from the problem, and stops the T310 timer.

Meanwhile, when T310 expires (no recovery during T1 603), the UE 100 determines that that the radio link failure has occurred, and starts an operation of selecting another connection destination cell. Further, the UE 100 activates the timer T311. A period of the timer T311 is T2.

When the UE 100 cannot reestablish connection with another cell during T2 (no recovery during T2 604), the UE 100 transitions to an RRC_Idle state (goes back to idle 605).

In this regard, when reselecting a cell and transmitting RRC Connection Reestablishment Request to the connection reestablishment destination eNB 200-2, the UE 100 activates the timer T301. Further, the UE 100 stops the timer T301 when receiving RRC Connection Reestablishment from the connection reestablishment destination eNB 200-2.

(Notification of Timer Configuration Information)

The UE 100 activates the timer T301 when transmitting RRC Connection Reestablishment Request. A value of the timer T301 is broadcasted by UE TimersAndConstants information element of System Information Block type 2 (SIB2) which is broadcast information.

FIG. 7 illustrates UE TimersAndConstants information element. A value which can be configured to the timer T301 includes 100 ms, 200 ms, 300 ms, 400 ms, 600 ms, 1000 ms, 1500 ms and 2000 ms.

When reselecting a cell, the UE 100 receives broadcast information SIB2 broadcasted by the reselected cell, and configures the value of the timer T301. Subsequently, the UE 100 transmits RRC Connection Reestablishment Request to the connection reestablishment destination eNB 200-2 which manages the reselected cell. In this case, the UE 100 activates the timer T301 at the value of the timer T301 specified by the broadcast information SIB2.

In this regard, eNB 200 can specify the value of the timer T301 by individual signaling. When the value of the timer T301 is specified by individual signaling, the UE 100 uses the value of the timer T301 specified by the individual signaling even if the timer T301 is specified by the SIB2 in the reselected cell.

(Connection Reestablishing Operation: Operation Between eNBs 200)

Figure 9:
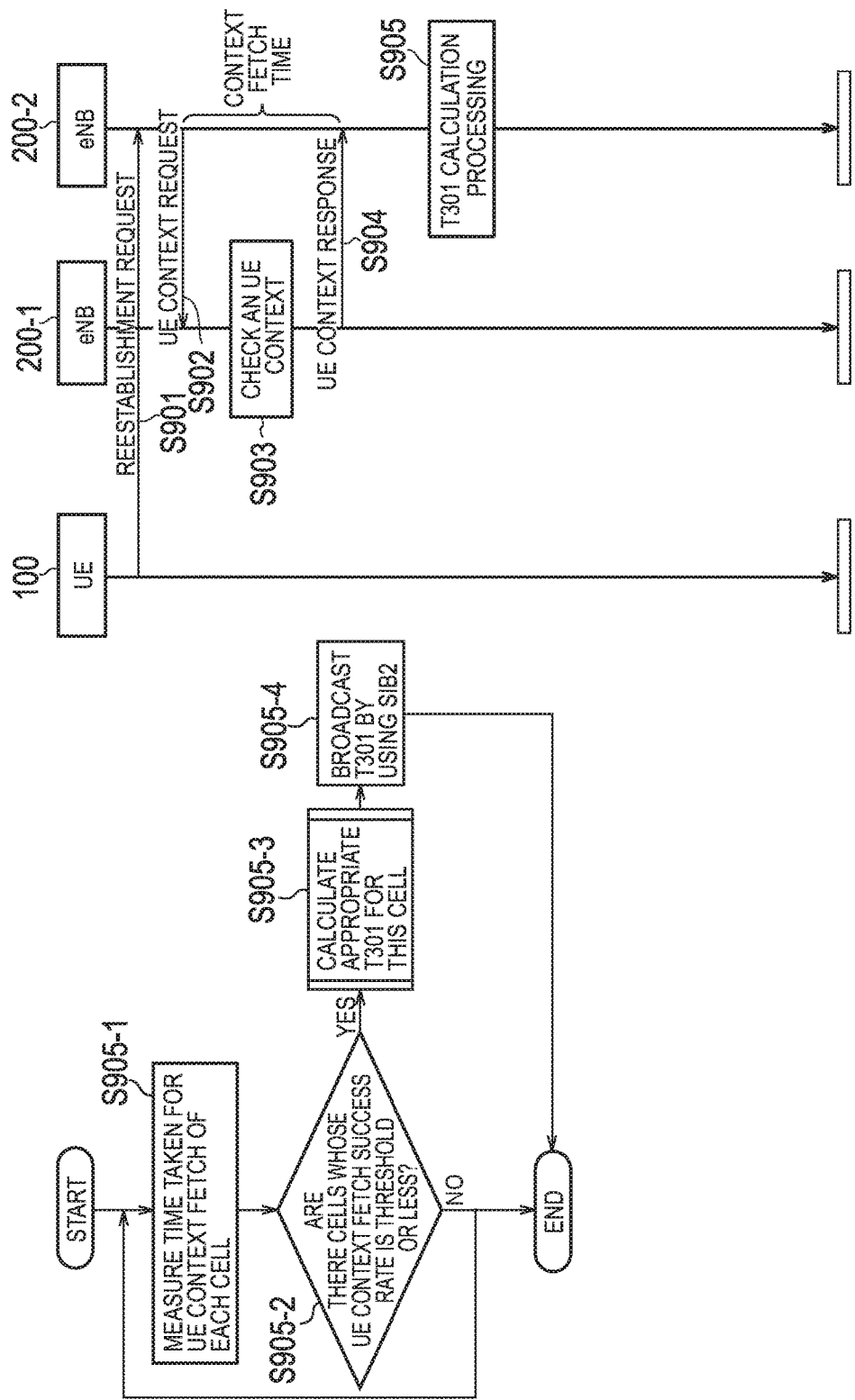
FIG. 9 is a flowchart and a sequence diagram according to the first embodiment (during broadcasting).

An operation between the eNBs 200 during connection reestablishment processing will be described with reference to FIG. 9.

The connection reestablishment destination eNB 200-2 receives RRC Connection Reestablishment Request from the UE 100 (S901). RRC Connection Reestablishment Request includes UE Context and, more specifically, includes Failure Cell PCI, C-RNTI and Short MAC-I.

The connection reestablishment destination eNB 200-2 transmits UE Context Request for making a reference as to UE Context received from the UE 100, to the connection reestablishment source eNB 200-1 (S902). A message format illustrated in FIG. 8 may be used as a message format of UE Context Request.

UE Context Request includes Failure Cell PCI, C-RNTI and Short MAC-I.

The connection reestablishment source eNB 200-1 having received UE Context Request checks whether or not the held parameters of the UE 100 match received PCI, C-RNTI and Short MAC-I (S903). When the match is found, the connection reestablishment source eNB 200-1 transmits UE Context Response which is a reference result response indicating the match to the connection reestablishment destination eNB 200-2 (S904).

Here, the connection reestablishment destination eNB 200-2 measures a time from transmission of UE Context Request to reception of UE Context Response, i.e., an UE Context Fetch procedure time (S905-1).

When there is a cell whose connection reestablishment success rate is lower than a predetermined threshold even though UE Context Fetch processing has been performed on this cell, the connection reestablishment destination eNB 200-2 changes the value of the timer T301 for this cell (S905-2 and S905-3). The connection reestablishment destination eNB 200-2 broadcasts the changed value of the timer T301 by using the SIB2 (S905-4).

A UE Context Fetch procedure time includes a signal transmission time (X2 transmission delay) between the eNBs 200 and a procedure time of the connection reestablishment source eNB 200-1.

The connection reestablishment destination eNB 200-2 changes the value of the timer T301 by using the broadcast information SIB2 according to the measured UE Context Fetch procedure time.

In this regard, the UE Context Fetch procedure time may start at a point of time at which the connection reestablishment destination eNB 200-2 receives RRC Connection Reestablishment Request. Further, the UE Context Fetch procedure time may end at a point of time at which the connection reestablishment destination eNB 200-2 transmits RRC Connection Reestablishment Request.

More specifically, the connection reestablishment destination eNB 200-2 changes a current value of the timer T301 to a longer value when the UE Context Fetch procedure time is longer than a predetermined threshold.

The predetermined threshold is preferably a current value of the timer T301 or a processing delay in a network which is allowable in view of the value of the timer T301.

Here, the connection reestablishment destination eNB 200-2 may change the current value of the timer T301 based on statistical data of the UE Context Fetch procedure time measured over a certain period of time.

In this regard, the connection reestablishment destination eNB 200-2 may collect statistical data of the UE Context Fetch procedure time per connection reestablishment source eNB 200-1 or per connection reestablishment source cell.

Further, the connection reestablishment destination eNB 200-2 is likely to perform UE Context Fetch processing on all eNBs 200 which are likely to be the connection reestablishment source eNB 200-1 when performing connection reestablishment processing. Hence, the connection reestablishment destination eNB 200-2 may measure UE Context Fetch procedure times of a plurality of eNBs 200-1 which becomes the connection reestablishment source eNB 200-1 over a certain period of time, and change the current value of the timer T301 based on a measurement result.

More specifically, the connection reestablishment destination eNB 200-2 may compare a measurement result distributed in a predetermined range (e.g., a range of ±3σ) of a normal distribution of measurement results obtained by measuring the UE Context Fetch procedure time over a certain period of time, and a predetermined threshold, and change the value of the timer T301.

Figure 10:
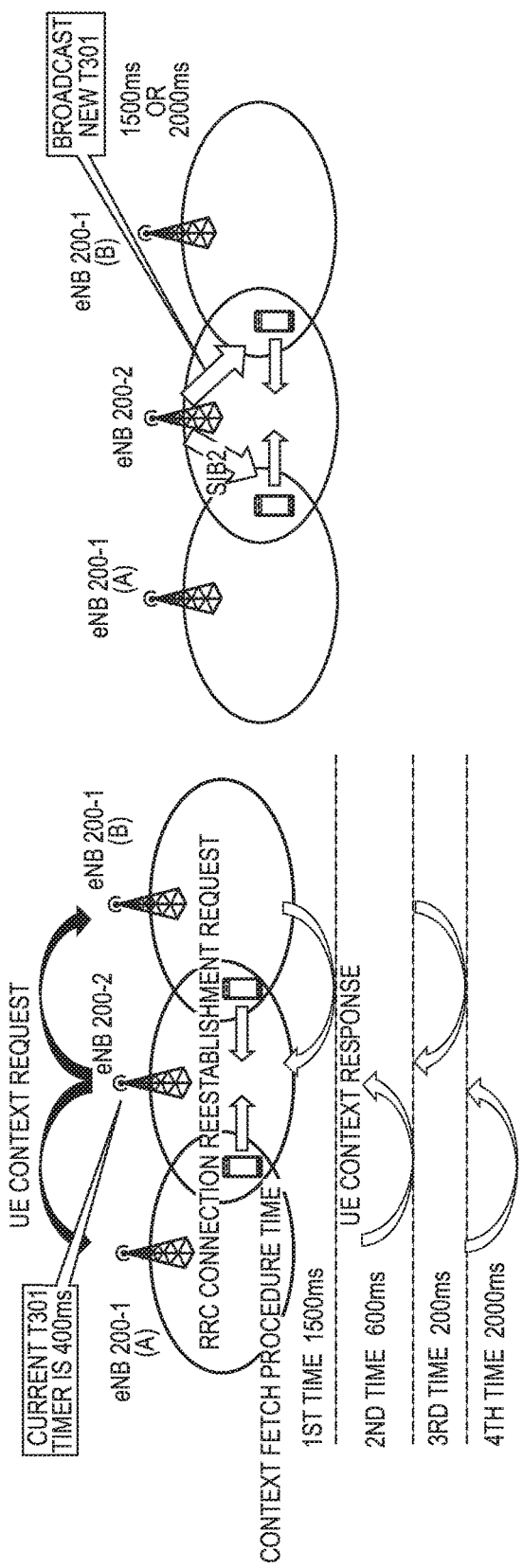
FIG. 10 is a system configuration diagram according to the first embodiment.

When, for example, the current timer T301 is 400 ms, the predetermined threshold is 400 ms, the UE Context Fetch procedure times between the connection reestablishment destination eNB 200-2 and the connection reestablishment source eNB 200-1 (A and B) are 1500 ms, 600 ms, 200 ms and 2000 ms as illustrated in FIG. 10, the connection reestablishment destination eNB 200-2 changes the timer T301 to a value longer than the current value. More specifically, the timer T301 is changed to 1500 ms or 2000 ms such that connection reestablishment processing success rate increases.

An example where the timer T301 is changed to a larger value has been described. However, when the timer T301 is longer, user communication quality deteriorates in some cases. For example, after transmitting RRC Reestablishment Request, the UE 100 cannot resume connection reestablishment processing for another cell as a connection reestablishment destination candidate until the timer T301 expires even when there is not a response from the transmission destination eNB 200 after transmitting RRC Reestablishment Request. As a result, the connection reestablishment processing success rate is likely to lower.

Hence, it is not necessary to configure the value of the timer T301 to an appropriate value which is not too long.

When, for example, the UE Context Fetch procedure time measured over a certain period of time is shorter than the predetermined period, the connection reestablishment destination eNB 200-2 may shorten the value of the timer T301. Alternatively, when the UE Context Fetch procedure time measured over the certain period of time tends to decrease, the connection reestablishment destination eNB 200-2 may be shorter than value of the timer T301 according to this tendency.

Here, the value of the timer T301 is likely to be configured by using individual signaling by the connection reestablishment source eNB 200-1. Hence, the connection reestablishment destination eNB 200-2 measures the UE Context Fetch procedure time of the predetermined period, and notifies the connection reestablishment source eNB 200-1 of the value of the timer T301 to change based on this measurement result.

Figure 11:
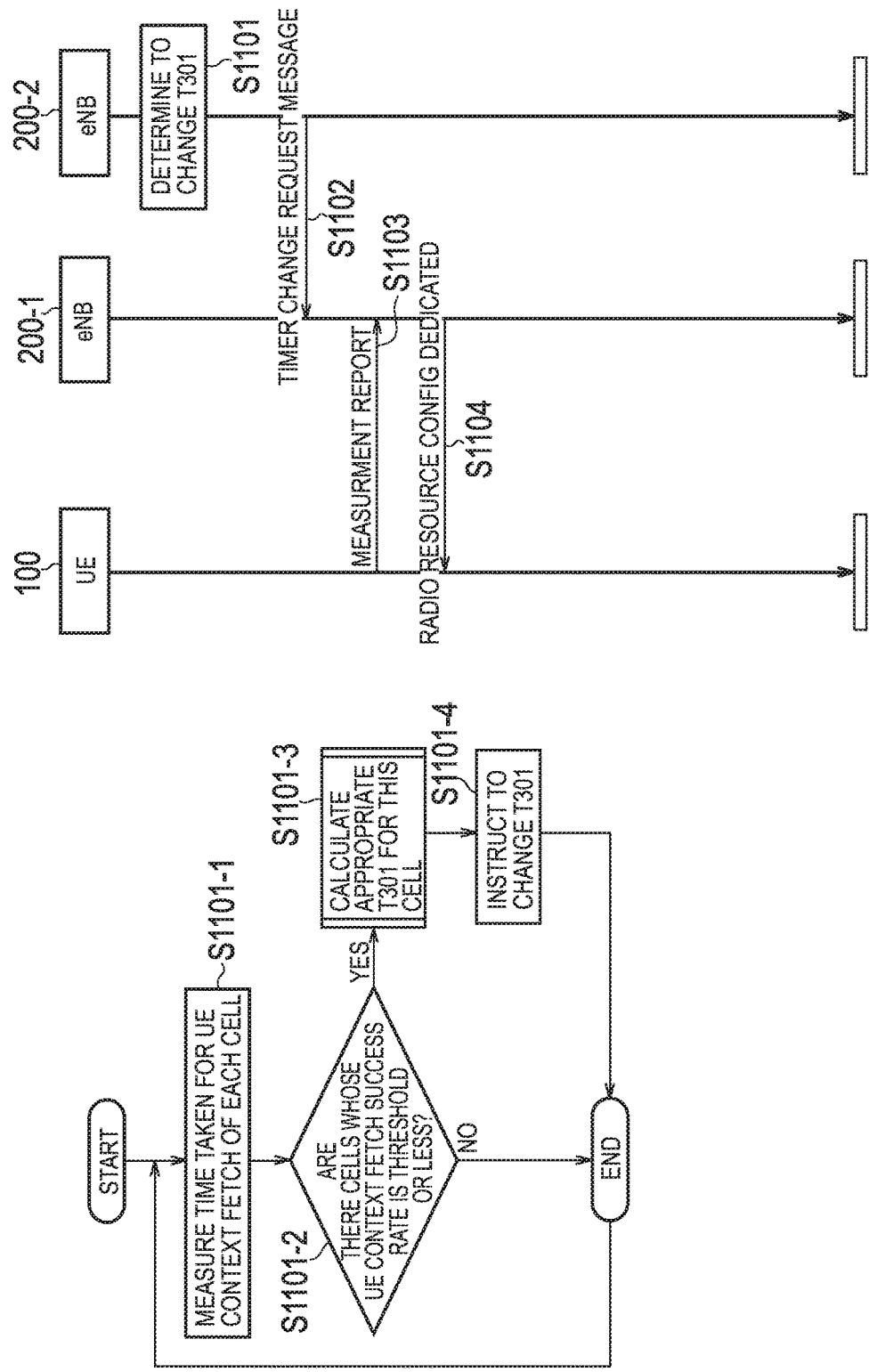
FIG. 11 is a flowchart and a sequence diagram according to the first embodiment (during individual signaling).

An operation of changing configurations of the timer T301 by using individual signaling will be described with reference to FIG. 11.

When determining to change the value of the timer T301 used in the cell managed by the connection reestablishment source eNB 200-1 (S1101), the connection reestablishment destination eNB 200-2 instructs the connection reestablishment source eNB 200-1 to change the timer T301 used in the connection reestablishment source eNB 200-1 by using a message of the X2 interface such as Timer Change Request in FIG. 12 (S1102). The changed value of the timer T301 is configured to Request Timer Indicator which is an information element (IE) of Timer Change Request.

Here, the connection reestablishment destination eNB 200-2 may measure the UE Context Fetch procedure time per connection reestablishment source eNB 200-1, compare a measurement result and the predetermined threshold and instruct the connection reestablishment source eNB 200-1 to increase the timer T301 when the measurement result exceeds the predetermined threshold.

More specifically, it is assumed that the UE Context Fetch procedure time between the connection reestablishment source eNB 200-1 and the connection reestablishment destination eNB 200-2 of part of the connection reestablishment source eNB 200-1 is longer than the value of the timer T301 configured by the connection reestablishment destination eNB 200-2, and the timer T301 cannot be applied to the connection reestablishment source eNB 200-1. In this case, the connection reestablishment source eNB 200-1 may configure the timer T301 corresponding to the UE Context Fetch procedure time, to the UE 100 which is likely to move from the connection reestablishment source eNB 200-1 to the eNB 200-2 by individual signaling.

Further, the UE Context Fetch procedure times of a plurality of connection reestablishment sources eNB 200-1 is substantially the same and is longer than the value of the timer T301 configured by the connection reestablishment destination eNB 200-2, the T301 of the connection reestablishment destination eNB 200-2 may be updated according to the UE Context Fetch procedure time.

The updated value of the timer T301 is configured to the UE 100 which is communicating with the cell managed by the connection reestablishment source eNB 200-1 and transmits a measurement report (S1103 Measurement Report) related to the cell managed by connection reestablishment destination eNB 200-2 by using individual signaling. Radio Resource Config Dedicated is used as individual signaling (S1104).

Consequently, even when the timer T301 is configured by individual signaling, it is possible to configure an appropriate value to the timer T301.

In this regard, an operation of the connection reestablishment destination eNB 200-2 of determining to change the timer T301 is the same as that of determining to change the timer T301 of the cell managed by the connection reestablishment destination eNB 200-2. That is, the connection reestablishment destination eNB 200-2 measures the UE Context Fetch procedure time per connection reestablishment source eNB 200-1, changes the T301 of a cell when there is the cell whose connection reestablishment success rate is lower than the predetermined threshold even though UE Context Fetch processing has been performed (S1101-1 to S1101-4), and broadcasts the changed T301 by using the SIB2.

(Function and Effect)

According to the first embodiment, the timer T301 is changed according to the UE Context Fetch procedure time. Consequently, the connection reestablishment processing success rate improves.

Second Embodiment

Differences of the second embodiment from the first embodiment will be described. According to the second embodiment, a value of a timer T301 is configured by focusing on a connection reestablishment procedure of an UE 100 and a connection reestablishment destination eNB 200-2.

(Connection Reestablishing Operation: Operation Between UE 100 and eNB 200)

Figure 13:
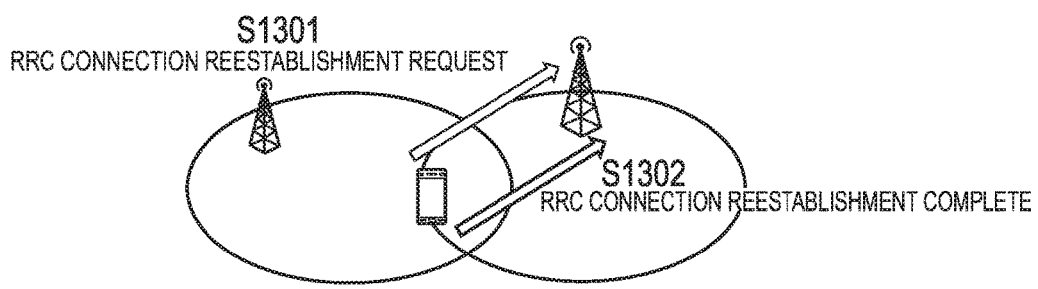
FIG. 13 is a system configuration diagram according to the second embodiment.

An operation according to the present embodiment will be described with reference to FIG. 13.

As described in the first embodiment, in the connection reestablishment procedure, an UE 100 transmits RRC Connection Reestablishment Request to the connection reestablishment destination eNB 200-2 which manages the selected cell, and activates the timer T301 (S1301).

When completing processing with a connection reestablishment source eNB 200-1, the connection reestablishment destination eNB 200-2 transmits RRC Connection Reestablishment to the UE 100. When the UE 100 receives RRC Connection Reestablishment, if the timer T301 is operating, the UE 100 transmits RRC Connection Reestablishment Complete to the connection reestablishment destination eNB 200-2 (S1302). Meanwhile, when the UE 100 receives RRC Connection Reestablishment, if the timer T301 has expired, the UE 100 does not transmit RRC Connection Reestablishment Complete to the connection reestablishment destination eNB 200-2.

The connection reestablishment destination eNB 200-2 counts the numbers of times that RRC Connection Reestablishment is transmitted and RRC Connection Reestablishment Complete is received (the number of times of successes). More specifically, the connection reestablishment destination eNB 200-2 counts (1) and (3) in FIG. 13 as the number of times of successes.

Further, the connection reestablishment destination eNB 200-2 counts the number of times that, even though RRC Connection Reestablishment has been transmitted, RRC Connection Reestablishment Complete is not received (the number of times of failures). More specifically, the connection reestablishment destination eNB 200-2 counts (2) in FIG. 13 as the number of times of failures.

The connection reestablishment destination eNB 200-2 changes a configuration value of the timer T301 such that a success probability (the number of times of successes/(the number of times of successes+the number of times of failures)) in a predetermined period exceeds a predetermined threshold.

When, for example, the success probability is lower than the predetermined threshold, the connection reestablishment destination eNB 200-2 increments the configuration value of the timer T301 by one. Incrementing the configuration value by one means, for example, changing the configuration value of the timer T301 from 400 ms to 600 ms.

Further, when the success probability is sufficiently high, the connection reestablishment destination eNB 200-2 decrements the configuration value of the timer T301 by one. Decrementing the configuration value by one means, for example, changing the configuration value of the timer T301 from 600 ms to 400 ms.

(Connection Reestablishing Operation: Operation Between eNBs 200)

Here, the timer T301 is also likely to be configured to the UE 100 by using individual signaling by the connection reestablishment source eNB 200-1. Hence, there is also a case where the connection reestablishment destination eNB 200-2 notifies the connection reestablishment source eNB 200-1 of the value of the timer T301 changed according to a relationship between the success probability and the predetermined threshold.

More specifically, similar to the first embodiment, the connection reestablishment destination eNB 200-2 instructs the connection reestablishment source eNB 200-1 to change the timer T301 used in the connection reestablishment source eNB 200-1 by using a message of an X2 interface such as Timer Change Request in FIG. 12.

A method of the connection reestablishment source eNB 200-1 for performing individual signaling on the UE 100 is the same as that in the first embodiment.

(Function and Effect)

According to the second embodiment, the timer T301 is changed according to a success probability of a RRC connection reestablishment procedure between each UE 100 and each eNB 200. Consequently, the connection reestablishment processing success rate improves.

Third Embodiment

What is common between the third embodiment, and the first embodiment and the second embodiment will not be described, and what is different from the first embodiment and the second embodiment will be mainly described.

(Connection Reestablishing Operation: Operation Between eNBs 200)

A connection reestablishment source eNB 200-1 according to the present embodiment counts the number of UE Context Requests received in a predetermined time from the connection reestablishment destination eNB 200-2 during connection reestablishment processing.

When the counted number of UE Context Requests exceeds a predetermined threshold, the connection reestablishment source eNB 200-1 adjusts a handover parameter between the connection reestablishment source eNB 200-1 and the connection reestablishment destination eNB 200-2.

More specifically, the connection reestablishment source eNB 200-1 adjusts the handover parameter to make it easy to perform handover from the connection reestablishment source eNB 200-1 to the connection reestablishment destination eNB 200-2.

When the counted number of UE Context Request exceeds the predetermined threshold, the connection reestablishment source eNB 200-1 determines that a radio link failure occurs during communication for which the connection reestablishment source eNB 200-1 and connection reestablishment destination eNB 200-2 need to perform handover processing, and adjusts the handover parameter.

(Function and Effect)

By adjusting a handover parameter between the eNBs 200 which frequently cause connection reestablishment processing, it is possible to suppress occurrence of the connection reestablishment processing.

Fourth Embodiment

What is common between the fourth embodiment, and the first to third embodiments will not be described, and what is different from the first to third embodiments will be mainly described.

(Connection Reestablishment Preparing Operation: Operation Between eNBs 200)

Figure 14:
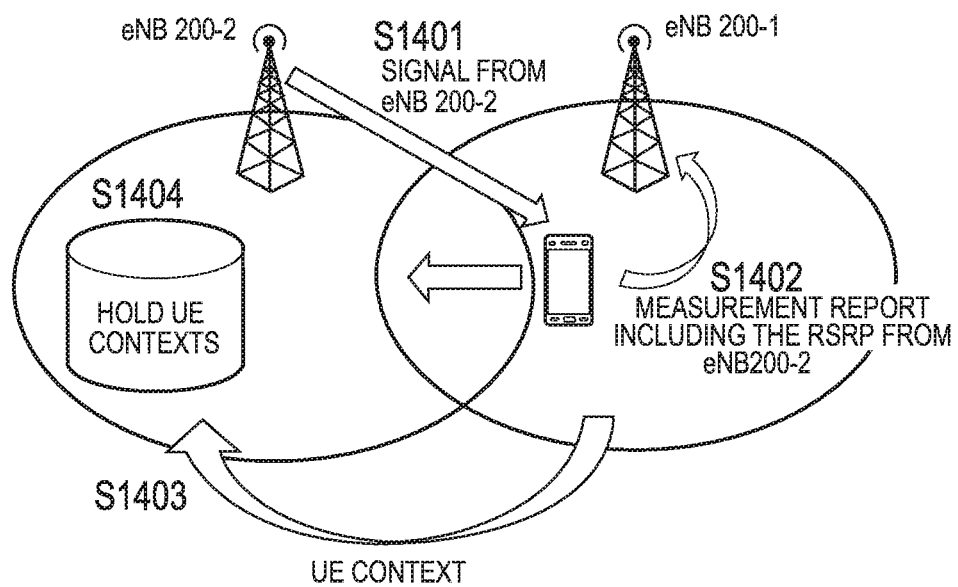
FIG. 14 is a system configuration diagram according to the fourth embodiment.

In the present embodiment, the eNBs 200 perform preparation processing in preparation for occurrence of connection reestablishment processing. This operation will be described with reference to FIG. 14.

A UE 100 transmits a measurement report including signal reception strength (RSRP) or signal reception quality (RSRQ) from an eNB 200-2, to an eNB 200-1 which manages a currently communicating cell (S1401 and S1402).

The eNB 200-1 having received the measurement report determines that a radio link failure has occurred and the UE 100 is highly likely to select a cell managed by the eNB 200-2. In this case, the eNB 200-1 transmits UE Context (PCI, C-RNTI and Short MAC-I) to the eNB 200-2 (S1403).

The eNB 200-2 receives UE Context from the eNB 200-1 and holds UE Context in preparation for occurrence of a radio link failure (S1404).

When receiving UE Context Request equal to or more than a predetermined threshold from the eNB 200-2 in a predetermined period (e.g. 10 or more UE Context Requests in one hour), the eNB 200-1 may determine that a radio link failure occurs and the UE 100 is highly likely to select a cell managed by the eNB 200-2.

Further, when the number of received UE Context Requests is large and, in addition, a load of a communicating cell or a load of the eNB 200-1 is high, the eNB 200-1 may transmit UE Context to the eNB 200-2. When a load of a communicating cell or a load of the eNB 200-1 is high, an UE Context Fetch procedure time taken as in response to a radio link failure increases, and it is highly likely that the UE 100 cannot receive RRC Connection Reestablishment from the eNB 200-2 before a timer T301 expires.

For example, the eNB 200-1 may make the above determination according to a flowchart illustrated in FIG. 15.

The eNB 200-1 counts the number of UE Context Requests received from the eNB 200-2 in the predetermined period (S1501 Counting a number of received UE CONTEXT REQUEST/Cell).

When the number of UE Context Requests from a specific cell exceeds a predetermined threshold related to the number of received UE Context Requests, the eNB 200-1 checks whether or not a measurement report related to the specific cell is received from the UE 100 (S1502 and S1503).

When receiving the measurement report from the UE 100, the eNB 200-1 determines whether or not the load of the cell which the UE 100 is communicating with (Load/Processing load) or the load of the eNB 200-1 exceeds a load-related predetermined threshold (S1504). When determining that the load of the cell which the UE 100 is communicating with or the load of the eNB 200-1 exceeds a load-related predetermined threshold (S1504), the eNB 200-1 transmits UE Context of the UE 100 having transmitted the measurement report, to the eNB 200-2 which manages the specific cell (S1505).

(Function and Effect)

When the UE 100 selects a subordinate cell of the eNB 200-2 after a radio link failure occurs, the eNB 200-2 does not need to fetch UE Context from the eNB 200-1, so that it is possible to shorten a connection reestablishment procedure time.

Other Embodiments

An LTE system has been described as an example of a mobile communication system in the above embodiments. However, the present application is not limited to the LTE system and may be applied to systems other than the LTE system.

In this regard, when message names and procedure names used in the above embodiments are different, these message names and procedure names are incorporated in the scope of the present application as long as substantially same processes are carried out.

Efficient connection reestablishment processing after a radio link failure has been described in the first embodiment to the fourth embodiment. However, these embodiments can be also combined and carried out. For example, a timer T301 may be changed by taking into account both of a required time of UE Context Request to UE Context Response in the first embodiment and a success probability of RRC Connection Reestablishment in the second embodiment.

This application claims priority to Japanese Patent Application No. 2014-152430 (filed on Jul. 25, 2014), the entire contents of which are incorporated by reference herein.

INDUSTRIAL APPLICABILITY

The present application is useful for a mobile communication field.

The invention claimed is:

1. A base station comprising:
a controller configured to perform connection reestablishment processing on a specific mobile station which has detected a radio link failure with another base station, in response to reception of a connection reestablishment request signal from the specific mobile station, wherein the controller is configured to:
after the reception of the connection reestablishment request signal, perform processing of changing a value of a predetermined timer to be set to a subordinate mobile station of the base station or the another base station, based on information related to a situation of the connection reestablishment processing,
the predetermined timer is a timer that defines a maximum waiting time from transmission of the connection reestablishment request signal to reception of a connection reestablishment response signal in the mobile station, and
the information related to the situation of the connection reestablishment processing includes information indicating a rate that the base station does not receive a corresponding connection reestablishment complete signal among connection reestablishment response signals transmitted by the base station.

2. The base station according to claim 1, wherein the controller is configured to perform processing of broadcasting configuration information indicating the changed value of the predetermined timer, in a cell managed by the base station.

3. The base station according to claim 1, wherein the controller is configured to perform processing of transmitting configuration information indicating the changed value of the predetermined timer, to the another base station.

4. The base station according to claim 1, wherein the controller is configured to collect the information related to the situation of the connection reestablishment processing over a certain period of time, and to perform the processing of changing the value of the predetermined timer based on the collected information.

5. The base station according to claim 1, wherein the information related to the situation of the connection reestablishment processing includes a time taken until the base station receives a context response signal from the another base station after the base station transmits a context request signal to the another base station.

6. The base station according to claim 5, wherein the context request signal is a reference request for making a reference to the specific mobile station, or a context information request for requesting transmission of context information of the specific mobile station.

7. The base station according to claim 1, wherein
before the timer is expired, the subordinate mobile station does not further transmit the connection reestablishment request signal.

8. A mobile station comprising:
a controller configured to transmit a connection reestablishment request signal for requesting connection reestablishment to another base station when a radio link failure with a base station is detected,
wherein the controller is configured to wait for reception of a connection reestablishment response signal from the another base station until a value of a timer expires after transmitting the connection reestablishment request signal,
the value of the timer is set based on information related to a situation of connection reestablishment processing in the another base station,
the value is set by the another base station after the connection reestablishment request signal is received by the another base station, and
the information related to the situation of the connection reestablishment processing includes information indicating a rate that the another base station does not receive a corresponding connection reestablishment complete signal among connection reestablishment response signals transmitted by the another base station.

\* \* \* \* \*